United States Patent [19]

Bronicki

[11] Patent Number: 4,590,384

[45] Date of Patent: May 20, 1986

[54] METHOD AND MEANS FOR PEAKING OR PEAK POWER SHAVING

[75] Inventor: Lucien Y. Bronicki, Rehovot, Israel

[73] Assignee: Ormat Turbines, Ltd., Yavne, Israel

[21] Appl. No.: 479,008

[22] Filed: Mar. 25, 1983

[51] Int. Cl.[4] ............................................. F01B 23/10
[52] U.S. Cl. .................................... 290/4 C; 290/40 B
[58] Field of Search ...................... 60/624; 290/4 R, 2, 290/52, 4 C, 40 B

[56] References Cited

U.S. PATENT DOCUMENTS

| | | | |
|---|---|---|---|
| 3,409,782 | 10/1965 | Bronicki | 290/2 |
| 3,944,837 | 3/1976 | Meyers et al. | 290/4 R |
| 3,986,575 | 10/1976 | Eggmann | 60/624 |
| 4,010,378 | 3/1977 | Tharpe et al. | 290/2 |
| 4,038,558 | 7/1977 | Gallois | 290/52 |
| 4,079,263 | 3/1978 | Inoue | 290/52 |
| 4,186,312 | 1/1980 | Dvorak | 290/4 R |
| 4,264,826 | 4/1981 | Ullmann | 290/2 |
| 4,433,547 | 2/1984 | Firey | 290/4 C X |

FOREIGN PATENT DOCUMENTS

| | | |
|---|---|---|
| 2544179 | 7/1976 | Fed. Rep. of Germany . |
| 1290002 | 2/1962 | France . |
| 2296295 | 7/1976 | France . |
| 659714 | 10/1951 | United Kingdom ............... 290/4 C |
| 751184 | 6/1956 | United Kingdom ............... 290/4 C |
| 1159090 | 7/1969 | United Kingdom . |

Primary Examiner—William M. Shoop, Jr.
Assistant Examiner—W. E. Duncanson, Jr.
Attorney, Agent, or Firm—Sandler & Greenblum

[57] ABSTRACT

In a power plant which furnishes low-grade heat to a Rankin cycle turbo generator operating with an organic fluid, a fast-starting prime mover is selectively coupled to the generator, the generator capacity of the generator is oversized relative to the individual capacities of the turbine in the prime mover.

12 Claims, 1 Drawing Figure

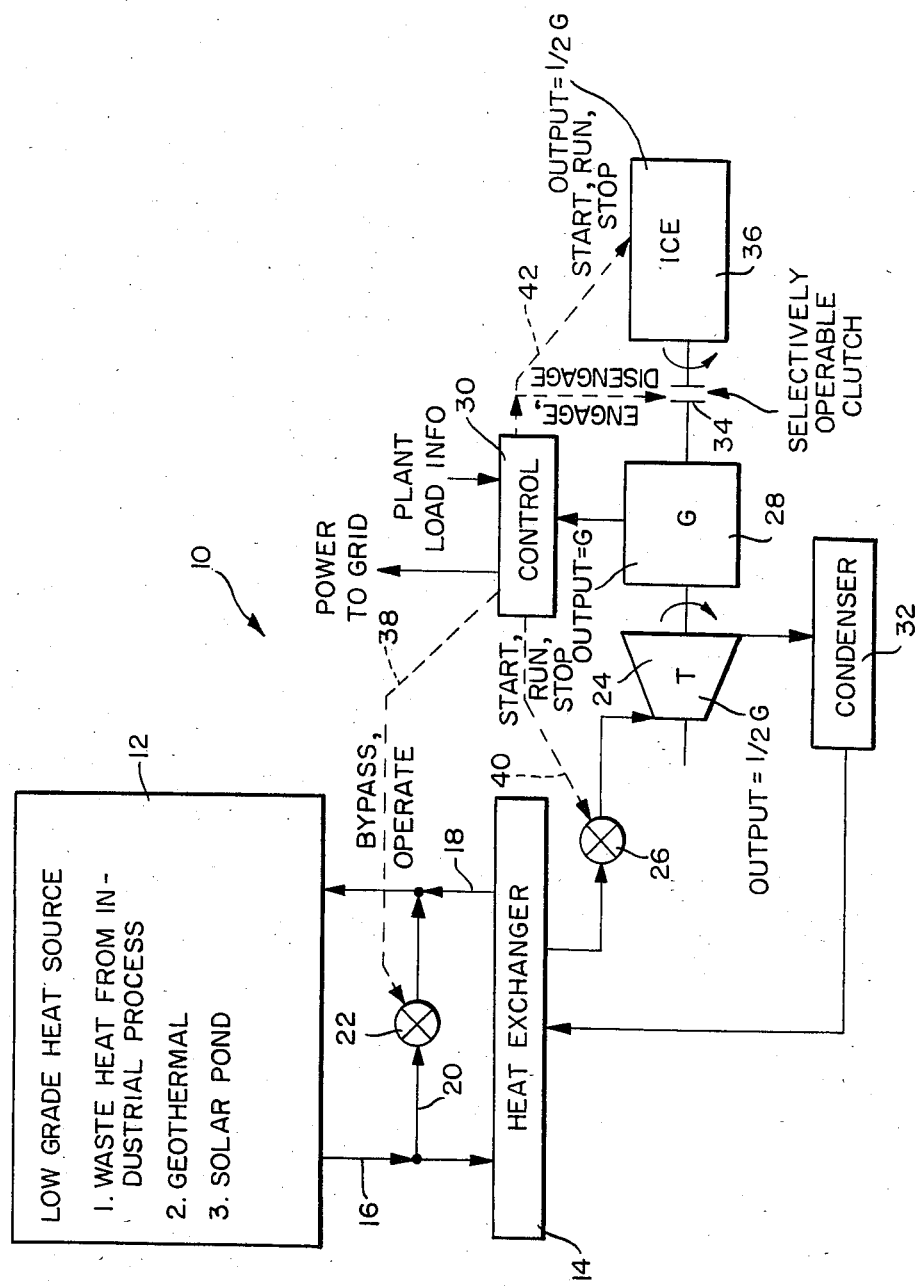

METHOD AND MEANS FOR PEAKING OR PEAK POWER SHAVING

TECHNICAL FIELD

This invention relates to a method of and means for peaking or peak power shaving.

BACKGROUND ART

Many industrial processes require large quantities of low grade heat which are conveniently and conventionally supplied in a form of low pressure steam. An industrial plant carrying out such processes, such as an oil refinery, continuously produces high pressure steam for a power plant that generates electricity, and obtains low pressure steam from the exhaust of the turbine power plant. Generally, the installed electrical load of an industrial plant greatly exceeds its generating capacity; and the plant contracts with a local power utility for its remaining power. The utility is obligated to furnish power up the installed electrical load of the industrial plant, or to the level established by agreement with the plant, even if such load occurs infrequently with time for only a few hours a day. Consequently, the utility must have generating capacity available for use when the industrial plant calls for its contracted power.

Because the peak power demands on a utility occur infrequently, a utility builds and regularily operates its most efficient plant to supply the baseload of the customers connected to its grid; and supplies intermediate loads, greater than the base load with less efficient plants. Peak power is supplied by operating diesel or gas turbine generating plants for very short intervals of time. These peak power generating units quickly can be brought onto and removed from the line and are advantageous from this standpoint. However, they are relatively inefficient and hence more expensive to operate than either the base or intermediate load power plants, such as coal or oil burning plants. Consequently, the cost of peak power is several times that of what is termed baseload power.

For a large industrial plant, such as oil refinery, the load requirements are so high, and the actual equipment to supply such load so complex and costly, that the plant is charged a fixed annual premium in order for the utility to be able to guarantee that it can deliver to the plant either 100% of its installed load or a predetermined portion thereof reached by agreement. Thus, the electrical bill of a large industrial plant has two components: a variable charge based on actual energy consumed, and a fixed annual charge based on the installed electrical capacity of the plant or the peak power that the utility is obligated to furnish on demand to the plant. The fixed annual charge as high as $100 per kW.

In order to reduce its annual fixed charge, a plant may install a standby power generating system based on a diesel driven generator whose operation is assured when the power being supplied by utility reaches the level predetermined by agreement between the utility and the plant. The switching in of standby generating capacity for supplying "peak power shaving" is cost effective after the fixed change reaches a threshhold. Computerized power saving techniques are presently in use for continuously monitoring the connected electrical load of a plant. These techniques arrange for hierarchical shutdown of the plant as the connected load increases beyond the total commited by the utility; for example, lighting loads are usually shed first. Thus, the peak power requirement of an industrial plant is of considerable economic importance in planning the operation of the plant.

Installation of energy saving systems in such a plant in order to convert low grade heat, normally wasted, to electrical power for the plant is often economically justified on the basis of the savings afforded by the variable charge for the energy generated using the low grade heat. This approach to energy saving does not address the primary problem of the fixed annual charge based on the installed capacity of the plant. For this reason, there is often hesitancy of the part of some plants to make the large capital investment required to convert low grade heat into energy.

It is therefore an object of the present invention to provide a new and improved method of and means for peak power shaving using low grade heat which permits a plant having low grade heat available to reduce its fixed annual charges at reduced initial investment.

BRIEF DESCRIPTION OF THE INVENTION

A peak shaving power plant according to the present invention for utilizing a source of low grade heat comprises a Rankine cycle turbine utilizing an organic working fluid, a boiler responsive to the low grade heat for vaporizing the working fluid, a generator driven by the turbine and having a generating capacity in excess of the capacity of the turbine, and a fast starting prime mover, such as an internal combustion engine having a capacity less than the generating capacity of the generator. A selectively operable coupling connects the output of the prime mover to the generator so that, on demand, the prime mover can drive the generator providing peak power shaving in the amount of the capacity of the prime mover.

The generating capacity of the generator is selected as the sum of the individual capacities of the turbine and prime mover. This arrangement is cost effective because the incremental cost in oversizing the generator relative to the Rankine cycle turbine is relatively small; and the prime mover provides the desired reliability for the peak power shaving operation. Because the output of the generator is sold back to the utility at a premium price, the net cost to increase the capacity of the generator and install the prime mover is about the same as the net income that derives from the sale of its power derived from the gross income from the sale of its power less the cost of fuel. When the prime mover is an internal combustion engine, the system will pay for itself within one year. This serial, hybrid power generation system makes waste heat utilization systems economically more attractive because the total saving is derived from the price of direct energy produced by the power plant as well as a reduction in the annual fixed charge imposed on the industrial plant by the utility, such reduction being the capacity of the prime mover.

BRIEF DESCRIPTION OF DRAWINGS

An embodiment of the invention is shown in the single figure in the accompanying drawing wherein a power plant according to the present plant is illustrated in block diagram form.

DETAILED DESCRIPTION

Referring now to the drawing, reference numeral 10, designates a power plant according to the present invention where the heat for the operation of the power plant is obtained from low grade heat source 12. As indicated in drawing, this heat source can be waste heat from an industrial process, heat from a geothermal source, or heat from a solar pond such as disclosed in application Serial No. 134,658 filed Mar. 27, 1980.

Power plant 10 comprises heat exchanger 14 coupled by input lines 16 and output lines 18 to heat source 12. Bypass line 20 having control valve 22, interconnects lines 16 and 18 for purpose of allowing the heat source to bypass the power plant.

Preferably, the power plant includes Rankine cycle turbine 24 which utilizes an organic working fluid such as Freon. A suitable turbine of this type is manufactured by Ormat Turbines Ltd and is described in U.S. Pat. No. 3,409,782.

Organic working fluid in liquid form contained in heat exchanger 14 is vaporized by heat from source 12 when bypass valve 22 is in a closed state. The vaporized working fluid passes through control valve 26 into turbine 24 where the working fluid expands causing the turbine to rotate and drive generator 28. The electrical power produced by the generator is applied to control 30 which is arranged to supply the power to the electrical grid of the local utility when a co-generation arrangement has been reached with the power company.

After the working fluid expands in turbine 24, it is exhausted into condenser 32 where condensation occurs. The condensate is then returned, either by pump or gravity, to boiler 14 and the cycle repeats.

Also coupled to generator 28 through selectively operable coupling such as clutch 34 is a quick starting prime mover such as a gas turbine, or an internal combustion engine 36, such as a gasoline engine or a gas engine but preferably a diesel. When coupling 34 is engaged, and internal combustion engine 36 is operated, generator 28 receives a part of its input from the internal combustion engine and a part from turbine 24 if bypass valve 20 is closed. Accordingly, generator 28 is oversized as compared to the capacities of turbine 24 and internal combustion engine 36. Typically, the capacity of turbine 24 could be 500 kW and the capacity of the internal combustion engine could also be 500 kW; and in such case, the capacity of the generator would be 1000 kW to permit a simultaneous operation by both the turbine and the internal combustion engine.

Control circuit 30 has control line 38 by which bypass valve 20 is operated thereby providing either bypass or operating conditions for the turbine. Control circuit 30 also has control line 40 for controlling valve 26 in the input vapor line to turbine 24. Control line 42 of circuit 30 selectively engages or disengages coupling 34 for starting, stopping and running internal combustion engine 36.

In normal operation, wherein the turbine would be operational and the internal combustion engine would not be operational, heat from a low grade heat source is converted into electrical energy by turbine 24. In such case, control circuit 30 maintains bypass valve 22 in its closed state and valve 26 in its open state in order to permit turbine 24 to operate. Generator 28 thus produces about 500 kW of electrical power which is supplied through control circuit 30 to the local utility. Control circuit 30 is effective to maintain coupling 34 disengaged and internal combustion engine 36 in its "stop" condition.

Control circuit 30 monitors the size of the plant load; and when this load reaches a predetermined limit established by agreement between the utility and the plant, control circuit 30 responds by sending a "start" and "run" signal to internal combustion engine 36, and an "engage" signal to coupling 34 so that the output of the engine is also applied to generator 28. This condition, during which internal combustion engine 36 contributes to the electrical generating capacity, will continue until the demand for a peak power has decreased to a threshold determined by control circuit 30. At that time, coupling 34 would disengage and a signal would be send to the internal combustion engine for stopping the same.

Reference numeral 34 has been described as a coupling, but in actual practice a clutched gear box or torque converter is preferred to permit start-up of the engine under no load conditions and the gradual coupling of this engine to the load. Various modes of operation are contemplated by which the inertia of the generator can be used to start the engine. Thus coupling 34 must be capable of permitting start-up of the prime mover whether the turbine is driving the generator or not. Finally, the present invention also envisages heat recovery from the exhaust gases of the prime mover.

Control circuit 30 exerts its controlling function on internal combustion engine 36 independently of whether bypass valve 20 is open or closed. Thus, the operator of the industrial process could shut down operation of turbine 24 in order to maintain heat exchanger 14 or because other reasons associated with heat source 12. In such case, control circuit 30 would still be effective to place on-line the power generated by internal combustion engine 36 upon demand for peak power as sensed by control circuit 30.

For a geothermal heat source, the cost of oversizing generator 28 and providing internal combustion engine 36 is about $100 per installed kW. Typically, the internal combustion engine will have to operate about 1500 hr/year in order to provide peaking power. In such case, the electrical energy produced by the internal combustion engine will be purchased by the utility at a premium rate, typically $0.10/kWh. Thus, the operator of the plant would receive about a $150 per installed kW of internal combustion engine from the power company. However, fuel cost for running a diesel engine for 1500 hours per year is currently about $50/kW. Thus, the installed cost of the engine and oversizing the generator would be repaid within about a year from the savings afforded by operation of the internal combustion engine for peak power shaving only. In addition, each standby kW, represented by the capacity of the internal combustion engine, will result in a reduction in the annual fixed charge applied against the industrial plant with which power plant 10 is associated.

The advantages and improved results furnished by the methods and apparatus of the present invention are apparent from the foregoing description of the invention. Various changes in the mode of operation may be made without departing from the spirit of the invention as described and the claims that follow.

What is claimed is:

1. In a power plant that furnishes low grade heat to an organic fluid Rankine cycle turbine that drives a generator, the improvement comprising the steps of oversizing the generating capacity of the generator relative to the individual capacities of the turbine and the prime mover, and selectively starting and coupling a fast starting prime mover to the generator in response to sensing a load on the generator in excess of a predetermined threshold.

2. The invention of claim 1 wherein the prime mover is an internal combustion engine.

3. The invention of claim 2 wherein the turbine and the internal combustion engine are substantially equal capacity.

4. The invention of claim 2 wherein the internal combustion engine is a diesel.

5. A peaking or peak shaving power plant comprising:
(a) a source of low grade heat;
(b) a Rankine cycle turbine utilizing an organic working fluid;
(c) a boiler responsive to said low grade heat for vaporizing the working fluid;
(d) a generator driven by the turbine and having a generating capacity in excess of the capacity of the turbine;
(e) a prime mover with a work capacity less than the generating capacity of the generator; and
(f) means for selectively coupling the prime mover to the generator.

6. A peaking or peak shaving power plant according to claim 5 wherein the prime mover is an internal combustion engine.

7. A peaking or peak shaving power plant according to claim 6 wherein the internal combustion engine is a diesel engine.

8. A peaking or peak power plant according to claim 7 wherein the source of low grade heat is a solar pond.

9. A peak shaving power plant according to claim 7 wherein the source of low grade heat is geothermal heat.

10. A peak shaving power plant according to claim 7 wherein the source of low grade heat is waste heat from an industrial process.

11. A peak shaving power plant according to claim 7 wherein the generator supplies power to a local grid, the power plant including means responsive to the load on the grid for starting up and operating the diesel engine whenever said load exceeds a threshold.

12. A method for peaking or peak power shaving in a system having a predetermined threshold electrical load comprising the steps of coupling a first power source to a generator whose capacity exceeds that of the first power source and which supplies part of said load, sensing said electrical load, and coupling a second, fast starting power source to the generator in response to sensing of said threshold.

* * * * *